United States Patent
He (10) Patent No.: US 11,256,865 B2
(45) Date of Patent: Feb. 22, 2022

(54) METHOD AND APPARATUS FOR SENDING STICKER IMAGE DURING CHAT SESSION

(71) Applicant: Tencent Technology (Shenzhen) Company Limited, Shenzhen (CN)

(72) Inventor: Ruiming He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 39 days.

(21) Appl. No.: 15/717,634

(22) Filed: Sep. 27, 2017

(65) Prior Publication Data

US 2018/0018319 A1 Jan. 18, 2018

Related U.S. Application Data (63) Continuation-in-part of application No. PCT/CN2016/105623, filed on Nov. 14, 2016.

(30) Foreign Application Priority Data

Nov. 20, 2015 (CN) .......................... 201510809061.7

(51) Int. Cl.
*G06F 40/279* (2020.01)
*G06F 40/30* (2020.01)
(Continued)

(52) U.S. Cl.
CPC .......... *G06F 40/279* (2020.01); *G06F 3/167* (2013.01); *G06F 40/30* (2020.01);
(Continued)

(58) Field of Classification Search
CPC ..... G06F 17/2765; G06F 3/167; H04L 51/046
See application file for complete search history.

(56) References Cited

U.S. PATENT DOCUMENTS

| | | | | |
|---|---|---|---|---|
| 9,575,996 B2* | 2/2017 | Yao | ...................... | G06F 16/5866 |
| 9,721,024 B2* | 8/2017 | Sa | ........................ | G06F 16/9535 |
| 2003/0185232 A1* | 10/2003 | Moore | .................. | H04M 15/09 |
| | | | | 370/465 |

(Continued)

FOREIGN PATENT DOCUMENTS

| | | |
|---|---|---|
| CN | 104125139 A | 10/2014 |
| CN | 104298429 A | 1/2015 |

(Continued)

OTHER PUBLICATIONS

Tencent Technology, ISRWO, PCT/CN2016/105623, dated Feb. 6, 2017, 9 pgs.

(Continued)

*Primary Examiner* — Stephen S Hong
*Assistant Examiner* — Nicholas Hasty
(74) *Attorney, Agent, or Firm* — Morgan, Lewis & Bockius LLP (57) ABSTRACT

The present disclosure provides a method for sending a sticker image during a chat session, applicable to a chat session between terminals including a transmit terminal and a receive terminal, the method being performed by the transmit terminal and including: detecting an input operation during a chat session and obtaining input content from the input operation; recognizing the input content and obtaining an implication, the implication indicating sticker features in the input content; identifying sticker images corresponding to the implication, the identified sticker images comprising multiple sticker images corresponding to different sticker sending policies; obtaining a recommended sticker image corresponding to the implication according to a preset sticker sending policy, the recommended sticker image being any one of or any combination of the multiple iden- (Continued)

tified sticker images; and sending the recommended sticker image to be displayed at the receive terminal.

14 Claims, 6 Drawing Sheets

(51) Int. Cl.
    *G06F 3/16*     (2006.01)
    *H04L 12/58*     (2006.01)
    *H04L 12/18*     (2006.01)
    *H04M 1/72439*     (2021.01)
    *H04M 1/72436*     (2021.01)
    *H04M 1/72469*     (2021.01)
    *H04L 51/04*     (2022.01)
    *H04L 51/046*     (2022.01)
    *H04L 51/10*     (2022.01)

(52) U.S. Cl.
    CPC .......... *H04L 12/1827* (2013.01); *H04L 51/04* (2013.01); *H04L 51/046* (2013.01); *H04L 51/10* (2013.01); *H04M 1/72439* (2021.01); *H04M 1/72436* (2021.01); *H04M 1/72469* (2021.01)

(56) References Cited

U.S. PATENT DOCUMENTS

| | | | |
|---|---|---|---|
| 2014/0324414 A1* | 10/2014 | Zhang | G06F 40/279 704/9 |
| 2015/0038235 A1* | 2/2015 | Kamekawa | A63F 13/12 463/42 |
| 2015/0220774 A1* | 8/2015 | Ebersman | G06F 3/0482 382/118 |
| 2016/0154825 A1* | 6/2016 | Yao | G06F 17/30268 382/218 |
| 2016/0210963 A1* | 7/2016 | Kim | G10L 15/1822 |

FOREIGN PATENT DOCUMENTS

| | | |
|---|---|---|
| CN | 104394057 A | 3/2015 |
| CN | 104484058 A | 4/2015 |
| CN | 104836726 A | 8/2015 |
| CN | 104917669 A | 9/2015 |
| CN | 105630849 A | 6/2016 |

OTHER PUBLICATIONS

Tencent Technology, IPRP, PCT/CN2016/105623, dated May 22, 2018, 8 pgs.

* cited by examiner

METHOD AND APPARATUS FOR SENDING STICKER IMAGE DURING CHAT SESSION

RELATED APPLICATIONS

This application is a continuation-in-part application of PCT/CN2016/105623, entitled "METHOD AND APPARATUS FOR SENDING STICKER IMAGE DURING CHAT SESSION" filed on Nov. 14, 2016, which claims priority to Chinese Patent Application No. 201510809061.7, filed with the State Intellectual Property Office of the People's Republic of China on Nov. 20, 2015, and entitled "METHOD AND APPARATUS FOR SENDING STICKER IMAGE DURING CHAT SESSION", both of which are incorporated herein by reference in their entirety.

FIELD OF THE TECHNOLOGY

The present disclosure relates to the field of computer application technologies, and in particular, to a method and an apparatus for sending a sticker image during a chat session and.

BACKGROUND OF THE DISCLOSURE

With development of the mobile Internet, more users chat with other users by using chat session functions provided by various chat session applications. During the chat sessions, the users usually express their feelings or attitudes by using sticker images, and vividly and precisely share current feelings or attitudes with other users.

However, as more sticker images are downloaded or saved in chat session applications, it is costly to search for a needed sticker image either in a mobile device, such as a smartphone, or in a terminal device such as a notebook computer. Consequently, in sending a sticker image during a chat session, searching for the sticker image costs the highest.

Since costs for sticker searching is relatively high, usually, when a user finally finds a sticker image suitable for a current chat session, a chat session scenario suitable for the sticker image has already ended. Therefore, in use of a sticker image during a chat session, costs for searching a large number of sticker images cannot be reduced, and consequently, sticker image sending efficiency is excessively low, resulting in limitations in chat session applications.

SUMMARY

Embodiments of the present application provide a method for sending a sticker image during a chat session.

The embodiments of the present application provide an apparatus for sending a sticker image during a chat session, and the apparatus can improve sticker image sending efficiency in use of the sticker image during the section when there are a lot of sticker images.

To resolve the foregoing technical problem, the following technical solutions are used.

A method for sending a sticker image during a chat session, applicable to a chat session between terminals, the terminals participating in the chat session including a transmit terminal for sending messages of the chat session and a receive terminal for receiving message of the chat session, the method being performed by the transmit terminal and including:

detecting an input operation during a chat session and obtaining input content from the input operation;

recognizing the input content and obtaining an implication, the implication indicating sticker features in the input content;

identifying sticker images corresponding to the implication, the identified sticker images including multiple sticker images corresponding to different sticker sending policies;

obtaining a recommended sticker image corresponding to the implication according to a preset sticker sending policy, the recommended sticker image being any one of or any combination of the multiple identified sticker images; and sending the recommended sticker image to be displayed at the receive terminal.

An apparatus for sending a sticker image during a chat session, applicable to a chat session between terminals, the terminals participating in the chat session including a transmit terminal for sending messages of the chat session and a receive terminal for receiving message of the chat session, the apparatus being disposed on the transmit terminal and including:

an input detection module, configured to detect an input operation during a chat session and obtain input content;

a recognition module, configured to recognize the input content and obtain an implication, the implication indicating sticker features in the input content;

an query module, configured to query sticker images corresponding to the implication, the identified sticker images including multiple sticker images corresponding to different sticker sending policies;

a recommendation module, configured to obtain a recommended sticker image corresponding to the implication according to a preset sticker sending policy, the recommended sticker image being any one of or any combination of the multiple identified sticker images; and a sending module, configured to send the recommended sticker image.

DESCRIPTION OF EMBODIMENTS

Typical implementations representing features and advantages of the present disclosure will be described below in detail. It should be understood that the present disclosure may have various changes in different implementations, and the changes do not depart from the scope of the present disclosure. In addition, the descriptions and figures are essentially used for illustration instead of limiting the present disclosure.

As described above, in a chat session application, users usually collect and download a large number of sticker images according to their hobbies for subsequent use in chat sessions with other users. In the chat sessions, the large number of sticker images lead to relatively high searching costs, and especially, in a mobile device with a screen of a relatively small size, it is difficult to search the large number of sticker images displayed on the small-sized screen for a needed sticker image.

In a chat session application with a large number of sticker images, how to avoid high costs in searching for a corresponding sticker image is an important technical problem that is urgently to be resolved currently.

Embodiments of the present application provide a method for sending a sticker image during a chat session. The method for sending a sticker image during the chat session is implemented by a computer program, and correspondingly, an apparatus for sending a sticker image during the constructed chat session is stored in a terminal device with a screen for running in the terminal device, so as to further obtain and send any sticker image during the chat session.

Figure 1:
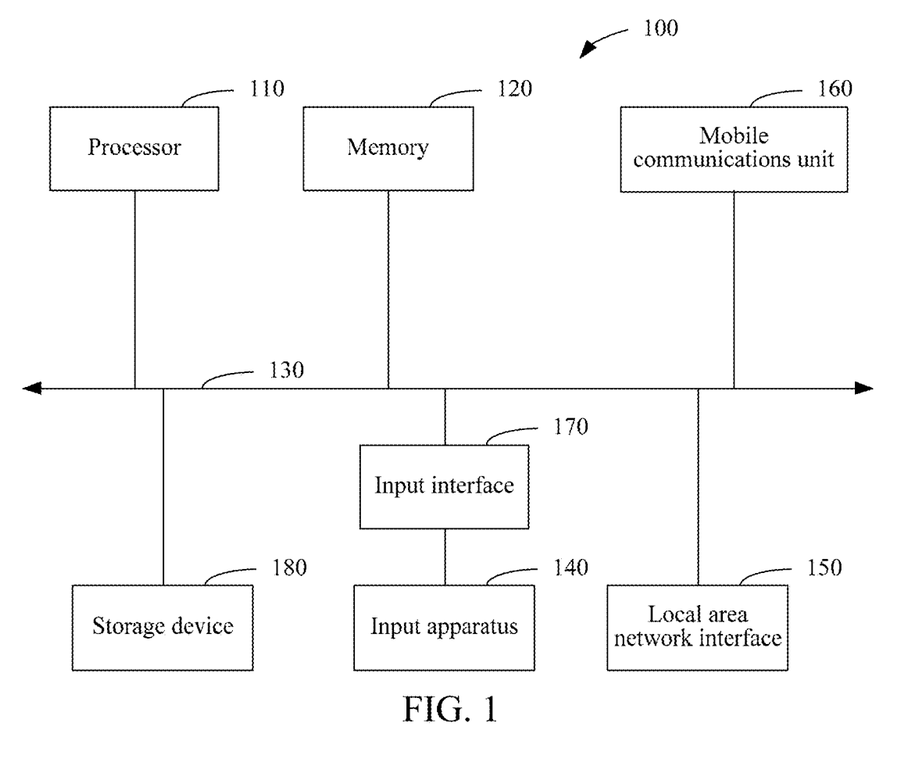
FIG. 1 is a schematic structural diagram of a terminal device according to an embodiment of the present application.

FIG. 1 shows a structure of a terminal device according to an embodiment of the present application. The terminal device 100 is an example applicable to the present disclosure, which should not be considered to provide any limitation to a use scope of the present disclosure. The terminal device 100 also should not be interpreted as a combination of one or more components in an exemplary terminal device 100 that needs to rely on or have figures.

As shown in FIG. 1, the terminal device 100 includes a processor 110, a memory 120, and a bus system 130. Various components including the memory 120 and the processor 110 are connected to the system bus 130. The processor 110 is hardware executing a computer program instruction by using basic arithmetic and logical operations in the computer system. The memory 120 is a physical device, for example, a non-transitory computer-readable storage medium, configured to temporarily or permanently store computer programs or data.

The memory 120 stores several sticker images, an implication corresponding to the sticker images, a preset sticker sending policy, and program instructions. The processor 110 executes the program instructions stored in the memory 12 to respond to an input operation during a chat session.

The terminal device 100 further includes various input interfaces 170 and an input apparatus 140 to input various operations. The input apparatus 140 may be at least one of a touchscreen, a button, a keyboard, a mouse, and an input voice component (e.g., a microphone). In some embodiments, the terminal device 100 also includes an output interface such as a touch-sensitive display and a speaker.

The terminal device 100 further includes a storage device 180, and the storage device 180 may be selected from various computer-readable storage mediums. The computer-readable storage medium is any available medium which can be accessed, including two types of mediums, namely, a mobile medium and a fixed medium. For example, a computer-readable storage medium includes, but is not limited to a flash memory (a micro SD card), a CD-ROM, a digital versatile disc (DVD) or another optical disc, a cassette, a magnetic tape storage device or another storage device, or any other medium that can be configured to store required information.

As described above in detail, the terminal device 100, applicable to the embodiments of the present application, performs an input operation during a chat session. That is, the terminal device 100 performs the input operation by means of the processor 110 running a program in the memory 120 in a specified form, so as to send a sticker image in the terminal device 100.

In addition, the embodiments of the present application may also be implemented by using a hardware appliance or a hardware circuit in combination with software instructions. Therefore, implementation of the embodiments of the present application is not limited to any particular hardware circuit, software, or a combination thereof.

Figure 2:
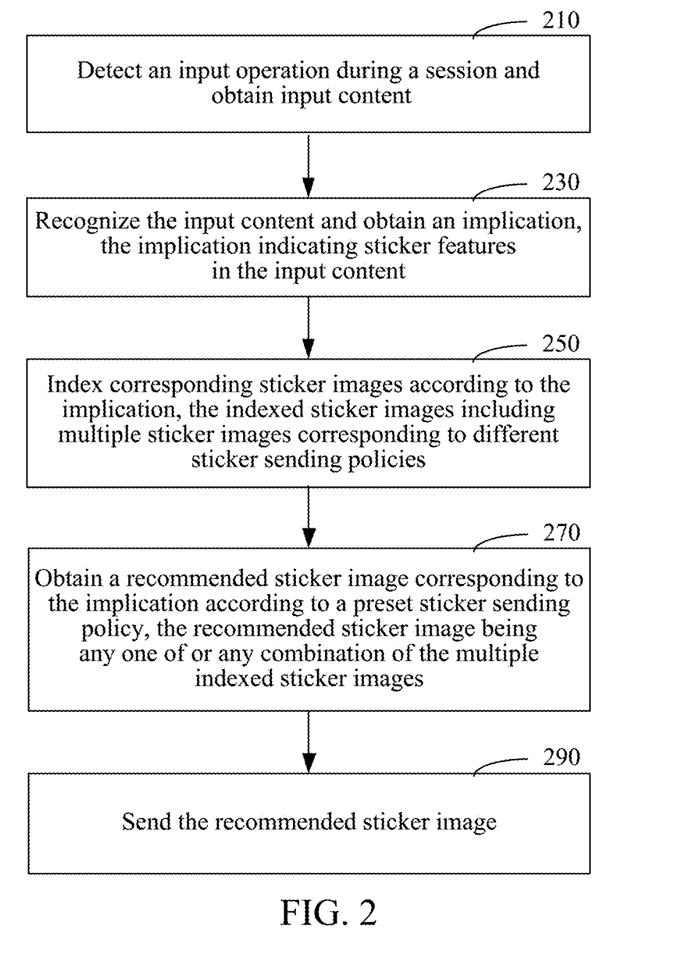
FIG. 2 is a flowchart of a method for sending a sticker image during a chat session according to an embodiment of the present application.

In an embodiment, specifically, the method for sending a sticker image during a chat session is shown in FIG. 2, and the method includes the following operations.

Operation 210. Detect an input operation during a chat session and obtain input content.

A chat session is a process of transferring content performed by a user, logging in to a chat session application in any terminal, to another user, and the chat session application used for implementing the chat session may be any chat tool such as an instant messaging tool, any social network tool having a chat session function, or any payment tool having a chat session function. Examples are not listed herein one by one.

In a chat session application to which a user logs in, the chat session application inputs and sends corresponding chat session content by using a chat session window with another user, and as a part of the input content, a sticker image is input and sent together with the input content.

In a chat session application, if a logged-in user needs to send a sticker image to another user to express a current feeling or mood, the logged-in user triggers an input operation in a chat session window with a target user. For the chat session application, if the triggered input operation in the chat session window is detected, input content is correspondingly obtained according to the input operation.

The input operation above may be an input voice operation, or may be an input text operation, or may be any feasible input operation. Examples are not listed herein one by one.

Operation 230. Recognize the input content and obtain an implication, the implication indicating sticker features in the input content.

Any sticker image is used for expressing a feeling or mood, correspondingly, most implications are feeling words or mood words and correspond to feelings or moods expressed by corresponding sticker images, and an implication in the input content indicates sticker features in the input content. For example, an implication may be "boring", and a corresponding sticker image A expresses a mood state of "boring".

Sticker features included in the input content are recognized and extracted, so as to obtain one or more implications included in the input content.

Operation 250. Index sticker images corresponding to the implication, the identified sticker images including multiple sticker images corresponding to different sticker sending policies.

A sticker database is locally set on the terminal and is configured to store sticker data. Sticker images are stored as sticker data in the sticker database by using an implication as an index. According to requirements, multiple sticker databases may be set and are separately a popular sticker database and a recently-used sticker database. Correspondingly, the popular sticker database is configured to store popular sticker data and is continuously updated as a backend server performs pushing. The recently-used sticker database is configured to store recently-used sticker data, and is continuously updated as a user in the terminal sends sticker images.

According to another aspect, multiple sticker sending policies are also locally preset on the terminal, and the sticker sending policies are used for limiting a source corresponding to a sent sticker image, that is, the used sticker data is limited by means of sticker sending policies. Different sticker sending policies correspond to different sticker data.

Because sticker images are stored by using an implication as an index, corresponding sticker images may be obtained according to an implication obtained according to an input operation, and subsequently, it is only needed to make a corresponding recommendation of a sticker image used in a chat session.

Operation 270. Obtain a recommended sticker image corresponding to the implication according to a preset sticker sending policy, the recommended sticker image being any one of or any combination of the multiple identified sticker images.

As described above, there are multiple sticker images associated with an implication and the sticker images are respectively from different sticker databases. A same implication may correspond to multiple sticker images in the popular sticker database, and may correspond to multiple sticker images in the recently-used sticker database. A sticker image, in the multiple identified sticker images, is recommended based on a preset sticker sending policy. That is, the obtained recommended sticker image is one or a few of the multiple identified sticker images, so that the recommended sticker image may be directly sent, or may be sent after a user makes a selection among the few sticker images, to ensure quick sending of a sticker image.

Operation 290. Send the recommended sticker image to be displayed at the receive terminal.

During a chat session between terminals, after obtaining the recommended sticker image corresponding to the implication, a transmit terminal only needs to directly send the recommended sticker image without searching for a sticker image before sending the recommended, thereby greatly improving efficiency and timeliness of sending a sticker image during the chat session.

It should be noted that, the process as stated above is applied to a chat session between terminals, the terminals participating in the chat session include a transmit terminal for sending messages of the chat session and a receive terminal for receiving message of the chat session, and the process as stated above is performed by the transmit terminal.

Further, in this embodiment, the input content is input voice content or input text content, and operation 230 includes the following operations.

The input voice content or the input text content is recognized to obtain a corresponding recognition result, and an implication is obtained according to the recognition result.

Feasible input manners of a terminal include voice input and text input, and correspondingly, an input operation during a chat session may be an input voice operation, or an input text operation. The input voice operation is an operation of content input performed during a chat session in a voice manner; the input text operation is an operation of text content input triggered by a chat session input box of a chat session window.

The input voice content or the input text content is recognized to obtain a recognition result, and an implication is recognized from the recognition result.

Specifically, for the input voice content, a recognition request for the input voice content is initiated to a backend server side to obtain a corresponding recognition result.

A built-in voice recognition module is disposed on the backend server side, and the voice recognition module of the server side is triggered by the recognition request initiated by the transmit terminal of the chat session, so that the input voice content is recognized by means of the triggered voice recognition module.

Figure 3:
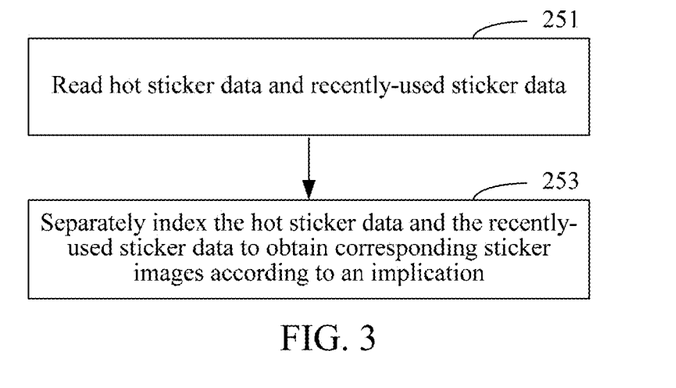
FIG. 3 is a flowchart of a method for querying corresponding sticker images according to an implication in FIG. 2.

In an embodiment, a preset sticker sending policy includes sending a popular sticker image and sending a recently-used sticker image. Operation 250, as shown in FIG. 3, includes the following operations.

Operation 251. Read popular sticker data and recently-used sticker data.

As described above, the popular sticker database and the recently-used sticker database is locally set on the terminal. Therefore, corresponding to the preset sticker sending policy, the popular sticker data and recently-used sticker data are read to obtain sticker images from the popular sticker data and the recently-used sticker data.

Operation 253. Separately query the popular sticker data and the recently-used sticker data to obtain sticker images corresponding to the implication.

Multiple sticker images corresponding to different sticker sending policies may be separately obtained by querying the popular sticker data and the recently-used sticker data according to the implication. During this process, searching for a sticker image during a chat session is avoided, so that a sticker image is quickly sent by means of an input operation and sticker image recommendation.

Figure 4:
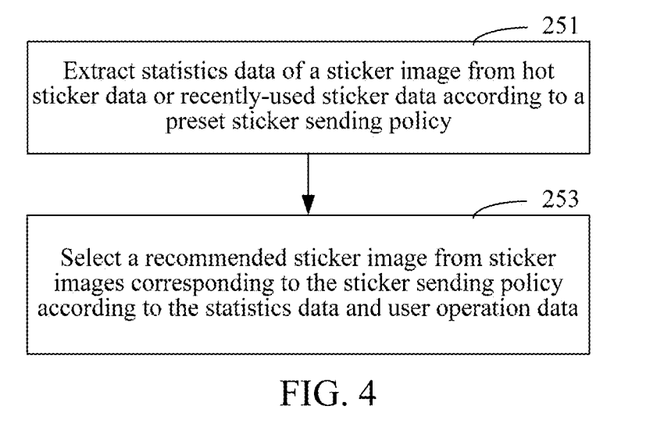
FIG. 4 is a flowchart of a method for obtaining a recommended sticker image corresponding to an implication according to a preset sticker sending policy in FIG. 2.

In an embodiment, as shown in FIG. 4, operation 270 includes the following operations.

Operation 271. Extract statistics data of a sticker image from the popular sticker data or the recently-used sticker data according to the preset sticker sending policy.

On a terminal performing a chat session, a sticker sending policy used for sending a sticker image is preset. For example, according to hobbies of a user or other factors, the preset used sticker sending policy may be a popular sticker sending policy or a recently-used sticker sending policy.

The sticker data includes the statistics data in addition to sticker images stored by using an implication as an index. The statistics data includes several data items, and the data items respectively correspond to the sticker images. That is, each sticker image in the sticker data corresponds to a data item in the statistics data.

Content of the data item may be a sending volume, which is used for counting a number of times for which each sticker image is sent by all users or a number of times for which each sticker image is sent by a logged-in user on the terminal.

Operation 273. Select the recommended sticker image from sticker images corresponding to the sticker sending policy according to the statistics data and user behavior data.

In the identified sticker images, sticker images corresponding to the preset sticker sending policy are selected, where a basis of the selection may be the statistics data or a combination of the statistics data and user behavior data, so as to obtain one or a few sticker images having the largest sending volume. The sticker image is the recommended sticker image.

The user behavior data is various data recording user behaviors in a terminal. For example, the data may be data representing user attributes such as an age, a gender, and a hobby of a user and a group to which the user belongs.

The user behavior data represents different habits of a user using sticker images, and different user groups have different habits of using sticker images.

A sticker image may be accurately recommended according to the user behavior data and the statistics data. For example, in the identified sticker images which corresponds to the preset sticker sending policy, a sticker image A (cheap), a sticker image B (cute), and a sticker image C (kuso) corresponding to an implication are obtained according to the statistics data, and it is found that the user is a cute girl according to the user behavior data. In this case, a sticker image is recommended after a ranking of the current sticker images is adjusted. That is, the ranking is adjusted to be: the sticker image B (cute), the sticker image A (cheap), and the sticker image C (kuso).

In this way, a sticker image is accurately recommended according to the user behavior data and the statistics data, so that the quick sending of a sticker image conforms to a user intention, and the sticker image is sent accurately and quickly.

To prevent a user from searching for a sticker image, one or a few recommended sticker images are obtained by means of selection, and the few sticker images are a user-selected sticker image combination.

Figure 5:
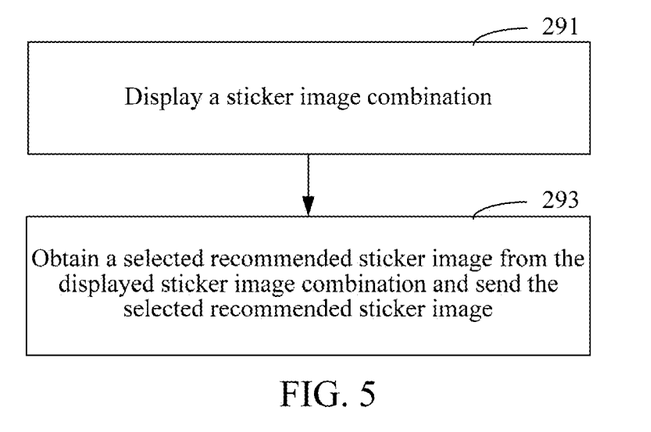
FIG. 5 is a flowchart of a method for sending a recommended sticker image in FIG. 2.

As shown in FIG. 5, operation 290 includes the following operations.

Operation 291. Display a sticker image combination.

After obtaining the recommended sticker images, the transmit terminal of the chat session displays the sticker image combination and displays a few recommended sticker images for a user to select.

Operation 293. Obtain the user-selected sticker image from the displayed sticker image combination, and send the user-selected sticker image.

The user-selected sticker image is sent after a selection operation is triggered on any displayed recommended sticker image.

In some embodiments, the transmit terminal may perform as follows: first, the transmit terminal displays the recommended sticker image in the chat session; then in response to a user selection (e.g., a finger touch) of the recommended sticker image, the transmit terminal starts rendering the input content along with the recommended sticker image. For example, if the input content is a text input, the transmit terminal may display the input content in a text format next to the recommended sticker image in the chat session. Note that the input content may stay on the display indicating that the user has selected the recommended sticker image or disappear after staying on the display for a predefined amount of time. Alternatively, the transmit terminal may play the input content in an audio format using a speaker of the transmit terminal. It should be noted that the audio format of the input content may be the original version recorded by a user of the transmit terminal or a processed version associated with the recommended sticker image (e.g., a computer-simulated sound). In some embodiments, the transmit terminal may alter an appearance (e.g., color, size, contrast, etc.) of the recommended sticker image in the chat session while rendering the input content at the receive terminal to attract further attention from the user of the transmit terminal. In some embodiments, the recommended sticker image is a short video and it will be played simultaneously while the input content is rendered in audio format.

In some embodiments, since this recommended sticker image is part of an existing chat session between the transmit terminal and the receive terminal, the transmit terminal sends both the recommended sticker image and the input content to the receive terminal. Upon receipt of both, the receive terminal displays the recommended sticker image on its display. In response to a user selection of the recommended sticker image, the receive terminal can render the input content as well. Note that the input content may be rendered in its original format (voice or text) or in a format processed by the receive terminal as described above in connection with the transmit terminal.

The following describes in detail the method for sending a sticker image during the chat session as described above with reference to a specific embodiment. In this embodiment, terminals participating in the chat session set a sticker sending policy first. Specifically, a user determines a sticker sending policy in a setting interface displayed on a terminal for subsequent use. In addition, a user also sets a function of quickly sending a sticker image through voice.

Based on settings of the sticker sending policy and the function of quickly sending a sticker image through voice, a server side, according to sticker image sending operations performed by all users, updates sending volumes of sticker images corresponding to each implication, and sorts sending volumes of sticker images corresponding to a same implication to obtain popular sticker data as follows:

TABLE 1

| Sticker image | Implication | Sending volume | Rank using an implication as a classification |
| --- | --- | --- | --- |
| Sticker image A | Thank you | 11500 | 1 |
| Sticker image B | Ho | 20001 | 1 |
| Sticker image C | Good night | 15131 | 1 |
| Sticker image D | Good-bye | 10020 | 1 |
| Sticker image E | Ho | 15363 | 2 |
| Sticker image F | Ho ho | 12022 | 3 |
| Sticker image G | Thank you | 10253 | 2 |
| ... | ... | ... | ... |

After obtaining the popular sticker data by means of maintenance, the server side pushes the data to a local terminal for the terminal to recommend and send a sticker image at any time.

According to another aspect, the local terminal continuously updates the sending volume according to sticker images sent by a user to maintain recently-used sticker data matching usage of sticker images of the user.

Figure 6:
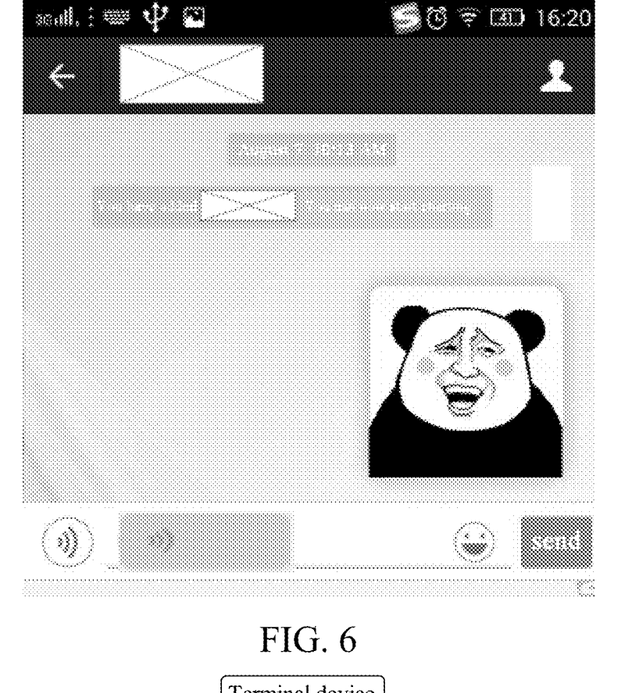
FIG. 6 is a schematic diagram of an interface of a chat session according to an embodiment.
Figure 7:
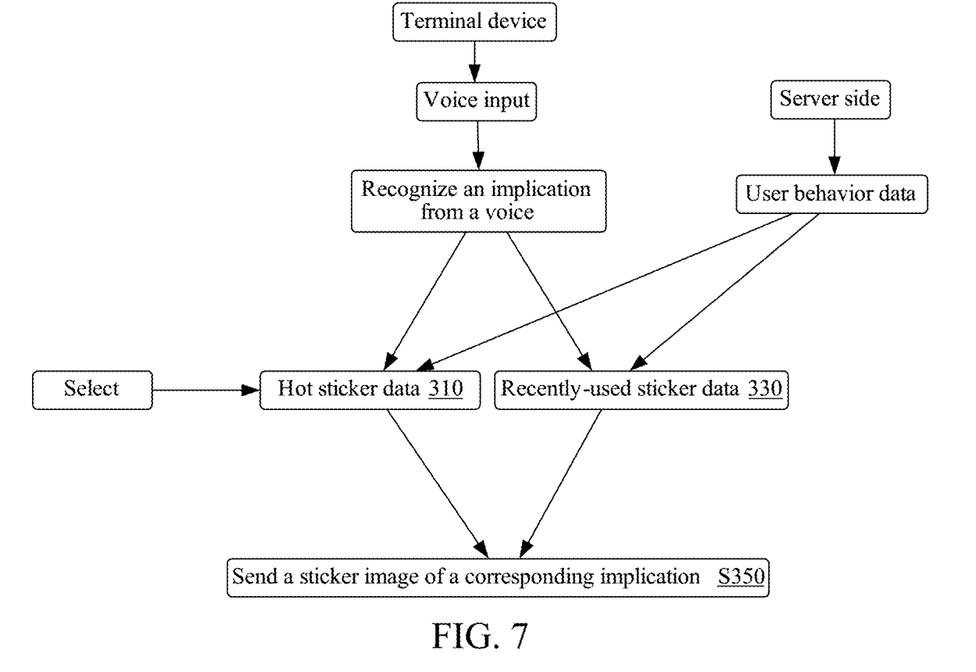
FIG. 7 is a schematic diagram of an application scenario of sending a sticker image during a chat session according to an embodiment of the present application.

Herein, an input voice operation, such as voice input in a chat session input box as shown in FIG. 6, is obtained by means of detection, and the terminal and the server side on which the input voice operation is performed quickly send a recommended sticker image corresponding to an implication by performing an operation as shown in FIG. 7.

As shown in FIG. 6, on a terminal, in a chat session window with a target user, input voice content is obtained by means of an input operation triggered by the user, and the input voice content needs to be recognized to obtain sticker features included in the input voice content to further convert the sticker features into a sticker image, so as to send the sticker image through voice.

As indicated in FIG. 7, two choices exist in sticker data, one is popular sticker data 310, and the other is recently-used sticker data 330. Therefore, sticker images indexed by using an implication include popular sticker images and recently-used sticker images, and a recommended sticker image is obtained according to a set sticker sending policy from the indexed popular sticker images or recently-used sticker images according to statistics data and user behavior data, and is sent. That is, operation S350 is performed.

Figure 8:
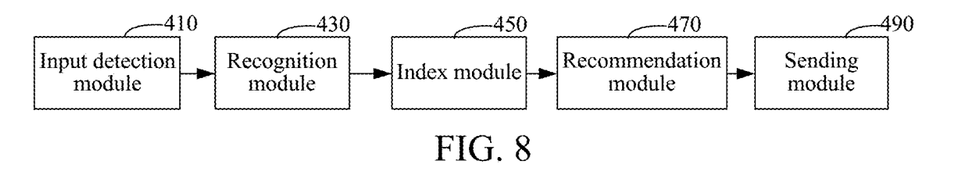
FIG. 8 is a schematic structural diagram of an apparatus for sending a sticker image during a chat session according to an embodiment of the present application.

In an embodiment, an apparatus for sending a sticker image during a chat session is provided correspondingly. The apparatus is applicable to a chat session between terminals, the terminals participating in the chat session including a transmit terminal for sending messages of the chat session and a receive terminal for receiving message of the chat session, and the apparatus is disposed on the transmit terminal. As shown in FIG. 8, the apparatus includes an input detection module 410, a recognition module 430, a query module 450, a recommendation module 470, and a sending module 490.

The input detection module 410 is configured to detect an input operation during a chat session and obtain input content.

The recognition module 430 is configured to recognize the input content and obtain an implication, the implication indicating sticker features in the input content.

The query module 450 is configured to query sticker images corresponding to the implication, the identified sticker images including multiple sticker images corresponding to different sticker sending policies.

The recommendation module 470 is configured to obtain a recommended sticker image corresponding to the implication according to a preset sticker sending policy, the recommended sticker image being any one of or any combination of the multiple identified sticker images.

The sending module 490 is configured to send the recommended sticker image.

Further, in this embodiment, the input content is input voice content or input text content, and the recognition module 430 is further configured to recognize the input voice content or the input text content to obtain a corresponding recognition result, and obtain the implication according to the recognition result.

Figure 9:
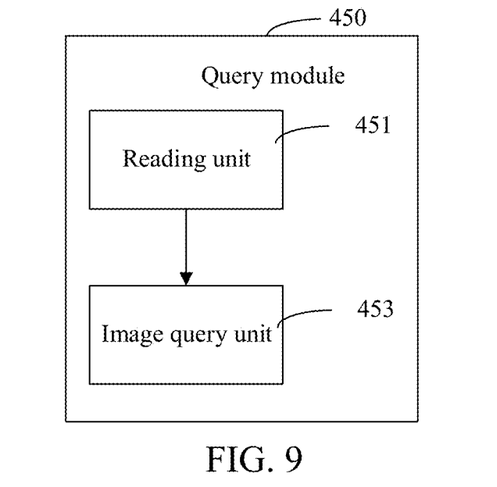
FIG. 9 is a schematic structural diagram of a query module in FIG. 8.

In an embodiment, a preset sticker sending policy includes sending a popular sticker image and sending a recently-used sticker image. As shown in FIG. 9, the query module 450 includes a reading unit 451 and an image query unit 453.

The reading unit 451 is configured to read popular sticker data and recently-used sticker data.

The image query unit 453 is configured to separately query the popular sticker data and the recently-used sticker data to obtain sticker images corresponding to the implication.

Figure 10:
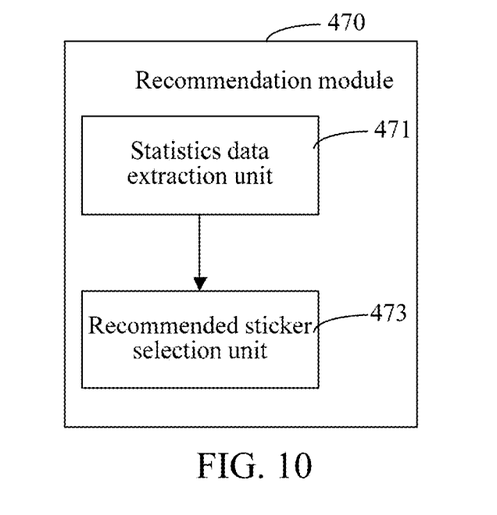
FIG. 10 is a schematic structural diagram of a recommendation module in FIG. 8.

In an embodiment, as shown in FIG. 10, the recommendation module 470 includes a statistics data extraction unit 471 and a recommended sticker selection unit 473.

The statistics data extraction unit 471 is configured to extract statistics data of a sticker image from the popular sticker data or the recently-used sticker data according to the preset sticker sending policy.

The recommended sticker selection unit 473 is configured to select the recommended sticker image from sticker images corresponding to the sticker sending policy according to the statistics data and user behavior data.

Figure 11:
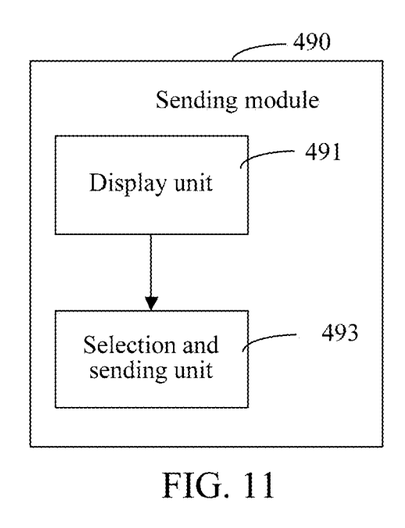
FIG. 11 is a schematic structural diagram of a sending module in FIG. 8.

In an embodiment, a recommended sticker image is a combination of the recommended sticker images, as shown in FIG. 11, the sending module 490 includes a display unit 491 and a selection and sending unit 493.

The display unit 491 is configured to display the sticker image combination.

The selection and sending unit 493 is configured to obtain the user-selected sticker image from the displayed sticker image combination, and send the user-selected sticker image.

A person of ordinary skill in the art may understand that all or some of the operations of the embodiments may be implemented by hardware or a program instructing related hardware. The program may be stored in a computer readable storage medium. The storage medium may include: a read-only memory, a magnetic disk, or an optical disc.

Although the present disclosure has been described with reference to several typical implementations, it should be understood that the terms used are descriptive and illustrative instead of being limitative. Since the preset disclosure can be specifically implemented in various forms without departing from the spirit or essence of the present disclosure, it should be understood that the above implementations are not limited to any of the foregoing details, but should be explained broadly within the spirit and scope defined by the appended claims. Therefore, all changes and modifications falling within the scope of the claims or an equivalent scope thereof should be covered by the appended claims.

What is claimed is:

1. A method for sending images of stickers during a chat session of an instant messaging tool between a first user at a transmit terminal and a second user at a receive terminal, the method being performed by the transmit terminal and comprising:

storing, at the transmit terminal: (1) popular sticker data that includes first sticker images used by a plurality of users of the instant messaging tool, wherein the first sticker images are continuously updated by a server that is communicatively connected with the transmit terminal and (2) recently-used sticker data that includes second sticker images that are recently used by the first user, wherein the second sticker images are continuously updated as the first user sends sticker images;

detecting, via a microphone of the transmit terminal, a voice input during a chat session with the receive terminal;

in response to the voice input:
identifying one or more keywords from the voice input;
separately querying the popular sticker data and the recently-used sticker data to identify multiple sticker images associated with respective expression words that correspond to the one or more keywords from the voice input, wherein the expression words associated with the identified sticker images correspond to feelings or moods expressed by the identified sticker images respectively;
for each of the multiple sticker images, extracting statistics data from the corresponding popular sticker data and the recently-used sticker data by the first user at the transmit terminal;
selecting, by the terminal and without user instructions, one sticker image from the multiple sticker images according to a preset sticker sending policy, wherein the preset sticker sending policy comprises:
identifying, from the multiple sticker images, a subset of sticker images based on the statistics data;
ranking the subset of sticker images according to user attributes indicative of the first user at the transmit terminal; and
selecting, from the subset of sticker images, the one sticker image according to the ranking; and
sending, without user instructions, the one sticker image in form of a new message of the chat session to be displayed at the receive terminal.

2. The method according to claim 1, wherein the sending, without user instructions, the one sticker image in form of a new message of the chat session to be displayed at the receive terminal comprises:
sending the one sticker image in the form of a new message of the chat session to be displayed at the receive terminal without any user input.

3. The method according to claim 1, wherein the sending the one sticker image in form of a new message of the chat session to be displayed at the receive terminal comprises:
sending the one sticker image and the input content obtained from the audio input operation to the receive terminal.

4. The method according to claim 1, further comprising:
displaying the one sticker image in the chat session at the transmit terminal; and
rendering the input content at the receive terminal.

5. The method according to claim 4, wherein rendering the input content at the receive terminal comprises:
displaying the input content in a text format next to the one sticker image in the chat session.

6. The method according to claim 4, wherein rendering the input content at the receive terminal comprises:
playing the input content in an audio format using a speaker of the transmit terminal.

7. The method according to claim 4, further comprising:
altering an appearance of the one sticker image in the chat session while rendering the input content at the receive terminal.

8. A transmit terminal for sending images of stickers to a receive terminal during a chat session of an instant messaging tool between a first user at the transmit terminal and a second user at the receive terminal, the transmit terminal comprising:
one or more processors;
memory; and
one or more programs stored in the memory, wherein the one or more programs comprise instructions that, when executed by the one or more processors, cause the transmit terminal to perform operations comprising:
storing, at the transmit terminal: (1) popular sticker data that includes first sticker images used by a plurality of users of the instant messaging tool, wherein the first sticker images are continuously updated by a server that is communicatively connected with the transmit terminal and (2) recently-used sticker data that includes second sticker images that are recently used by the first user, wherein the second sticker images are continuously updated as the first user sends sticker images;
detecting, via a microphone of the transmit terminal, a voice input during a chat session with the receive terminal;
in response to the voice input:
identifying one or more keywords from the voice input;
separately querying the popular sticker data and the recently-used sticker data to identify multiple sticker images associated with respective expression words that correspond to the one or more keywords from the voice input, wherein the expression words associated with the identified sticker images correspond to feelings or moods expressed by the identified sticker images respectively;
for each of the multiple sticker images, extracting statistics data from the corresponding popular sticker data and the recently-used sticker data by the first user at the transmit terminal;
selecting, by the terminal and without user instructions, one sticker image from the multiple sticker images according to a preset sticker sending policy, wherein the preset sticker sending policy comprises:
identifying, from the multiple sticker images, a subset of sticker images based on the statistics data;
ranking the subset of sticker images according to user attributes indicative of the first user at the transmit terminal; and
selecting, from the subset of sticker images, the one sticker image according to the ranking; and
sending, without user instructions, the one sticker image in form of a new message of the chat session to be displayed at the receive terminal.

9. The transmit terminal according to claim 8, wherein the sending, without user instructions, the one sticker image in form of a new message of the chat session to be displayed at the receive terminal comprises:
sending the one sticker image in the form of a new message of the chat session to be displayed at the receive terminal without any user input.

10. The transmit terminal according to claim 8, wherein the sending the one sticker image in form of a new message of the chat session to be displayed at the receive terminal comprises:
sending the one sticker image and the input content obtained from the audio input operation to the receive terminal.

11. The transmit terminal according to claim 8, wherein the operations further comprise:
displaying the one sticker image in the chat session at the transmit terminal; and
rendering the input content at the receive terminal.

12. A non-transitory computer-readable storage medium storing one or more programs that, when executed by one or more processors of a transmit terminal, cause the transmit terminal to send images of stickers to a receive terminal during a chat session of an instant messaging tool between a first user of the transmit terminal and a second user of a receive terminal by performing a plurality of operations including:
storing, at the transmit terminal: (1) popular sticker data that includes first sticker images used by a plurality of users of the instant messaging tool, wherein the first sticker images are continuously updated by a server that is communicatively connected with the transmit terminal and (2) recently-used sticker data that includes second sticker images that are recently used by the first user, wherein the second sticker images are continuously updated as the first user sends sticker images;

detecting, via a microphone of the transmit terminal, a voice input during a chat session with the receive terminal;

in response to the voice input:
  identifying one or more keywords from the voice input;
  separately querying the popular sticker data and the recently-used sticker data to identify multiple sticker images associated with respective expression words that correspond to the one or more keywords from the voice input, wherein the expression words associated with the identified sticker images correspond to feelings or moods expressed by the identified sticker images respectively;
  for each of the multiple sticker images, extracting statistics data from the corresponding popular sticker data and the recently-used sticker data by the first user at the transmit terminal;
  selecting, by the terminal and without user instructions, one sticker image from the multiple sticker images according to a preset sticker sending policy, wherein the preset sticker sending policy comprises:
    identifying, from the multiple sticker images, a subset of sticker images based on the statistics data;
    ranking the subset of sticker images according to user attributes indicative of the first user at the transmit terminal; and
    selecting, from the subset of sticker images, the one sticker image according to the ranking; and
  sending, without user instructions, the one sticker image in form of a new message of the chat session to be displayed at the receive terminal.

13. The non-transitory computer-readable storage medium according to claim 12, wherein the sending the one sticker image in form of a new message of the chat session to be displayed at the receive terminal comprises:
  sending the one sticker image and the input content obtained from the audio input operation to the receive terminal.

14. The non-transitory computer-readable storage medium according to claim 12, wherein the operations further comprise:
  displaying the one sticker image in the chat session at the transmit terminal; and
  rendering the input content at the receive terminal.

* * * * *